United States Patent
Cooper et al.

(10) Patent No.: US 7,518,754 B2
(45) Date of Patent: Apr. 14, 2009

(54) APPARATUS AND METHOD FOR ERROR DIFFUSION WITH DITHER

(75) Inventors: Brian E. Cooper, Lexington, KY (US);
Shaun T. Love, Lexington, KY (US);
Steven F. Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 631 days.

(21) Appl. No.: 11/206,400

(22) Filed: Aug. 18, 2005

(65) Prior Publication Data

US 2007/0041053 A1   Feb. 22, 2007

(51) Int. Cl.
*H04N 1/40* (2006.01)
(52) U.S. Cl. .................. 358/3.03; 358/3.06; 358/3.13
(58) Field of Classification Search ............. 358/3.03, 358/3.04, 3.05, 3.06, 3.13; 382/251, 252
See application file for complete search history.

(56) References Cited

U.S. PATENT DOCUMENTS

| | | | | |
|---|---|---|---|---|
| 4,924,322 A * | 5/1990 | Kurosawa et al. | ............ | 358/448 |
| 5,243,443 A * | 9/1993 | Eschbach | .................... | 358/3.03 |
| 6,271,936 B1 * | 8/2001 | Yu et al. | .................... | 358/3.04 |
| 6,563,957 B1 * | 5/2003 | Li et al. | ...................... | 382/252 |
| 7,369,276 B2 * | 5/2008 | Couwenhoven et al. | .... | 358/3.03 |
| 2003/0133160 A1 * | 7/2003 | Sharma et al. | ............. | 358/3.06 |

\* cited by examiner

*Primary Examiner*—Thomas D Lee
(74) *Attorney, Agent, or Firm*—Christine K. Garcia

(57) ABSTRACT

The input pixels in an image to be halftoned using error diffusion are dithered using a first type of passband dither. A second type of passband dither may also be added to a thresholding matrix used in halftoning. This second type of passband dither may be the same as the first type of passband dither. In such case, the second type of passband dither is a scaled multiple of the first type of passband dither. The halftoning process may be implemented in an application specific integrated circuit.

17 Claims, 6 Drawing Sheets

APPARATUS AND METHOD FOR ERROR DIFFUSION WITH DITHER

FIELD OF THE INVENTION

The present invention relates generally to halftoning of an image using error diffusion, such as in preparation for printing. More particularly, it concerns a method for halftoning in which dither is added to the input image and to the thresholding matrix used in the error diffusion step.

DESCRIPTION OF THE RELATED ART

Halftoning provides a way to represent a continuous-tone image on a device, such as a printer or display, that can physically produce only a finite number of tone levels. The illusion of multiple tone levels is created by forming a high-frequency pattern of dots, dot clusters, or lines.

Halftoning techniques may be broadly split into two categories: point operators and area operators. When using point operators, only one input pixel must be considered to determine the corresponding output pixel. Thus, point operators are very fast. In contrast, area operators must consider an area of the input image (i.e., multiple input pixels) in order to determine each output pixel. Area operators require more time, but they typically yield better quality output.

The most common point operator is a halftone screen, also known as a threshold array or dither array. A halftone screen is a two-dimensional array of numeric threshold values. A halftone screen of size N×M pixels may be used on an input image of size P×Q pixels, where P may be several times larger than N, and Q may be several times larger than M. Conceptually, the N×M screen is replicated, or "tiled" both horizontally and vertically to cover the entire input image. Each input pixel is matched to its corresponding threshold value. If the input pixel's value exceeds this threshold, the corresponding output pixel will be marked with a dot. Otherwise, the output pixel will be blank.

Halftone screens may be classified according to the size and arrangement of the dot clusters that they tend to form. Dots may be grouped together into clusters, or they may remain separate or dispersed. In either case, the dots or clusters may be arranged in an ordered or periodic pattern, or they may be arranged in a non-periodic, somewhat random pattern, often called "stochastic."

Isolated dots provide better quality, since they can produce higher spatial frequencies. However, many printing devices have difficulty rendering isolated dots consistently. Clustered dots are much more tolerant of such physical limitations, providing better stability on such devices.

Ordered patterns are usually simpler to design and allow smaller threshold arrays, as compared to stochastic patterns. However, ordered patterns are periodic, which can cause prominent and objectionable periodic moiré when interacting with other periodic signals (such as periodic content in the image itself). Although periodic moiré is possible with stochastic screens, such "stochastic moiré" is spread across a range of spatial frequencies and, therefore, may be much less objectionable.

The earliest halftoning method used an ordered clustered-dot screen. Such screens are stable and well-understood, and they persist throughout the commercial printing industry. The first ordered, dispersed-dot screen (Bayer Screen), developed in 1973, was able to minimize low frequency textures but nevertheless produced distinct periodic patterns.

Stochastic screens became popular in the 1990's, offering the better quality of dispersed dots without the periodic artifacts of a Bayer screen. However, the individual dots are difficult to render for many printers. Later, clustered stochastic screens addressed the rendering problem, although the aperiodic distribution of clusters can still be more difficult to control than the uniform, periodic clusters of ordered, clustered-dot screens.

While screens provide a fast halftoning solution, area operators offer better quality. The predominant method in this category of halftoning is error diffusion. Halftone transformation results, on a pixel-by-pixel basis for all image pixels, in the replacement of an original non-binary, or tone level or "gray-level" value of, e.g., 8 bits, with a reduced bit value after comparison with some threshold. Oftentimes, the original number of bits is reduced to a single bit to form a binary image, but it may be reduced to any number of bits less than the original number. The term "gray-level" in this context may refer to a non-binary value, which can pertain to either a 'non-color' ("black and white") image or to a certain plane in a color image.

The threshold itself may vary dynamically depending on the original pixel value ("tone-dependent threshold") and other factors. During binary thresholding, the original 8-bit value at each pixel is substituted by either a "0" (representing an 8-bit value of 0) or a "1" (representing an 8-bit value of 255). The consequence of such a transformation at a pixel is that the overall "brightness" of the image is changed. To mitigate this, the change, or "error", may be diff-used to nearby, as-yet-untransformed pixels through a technique known as error diffusion.

Error diffusion works by spreading the inaccuracy, or error, of the halftone decision at one pixel in the output image among nearby pixels, thereby creating a visually superior transformation. Each original pixel value is adjusted based on the error contributed by adjacent and nearby pixels, and these contributions are taken into account in calculating the correct transformed value for the pixel.

There are a number of error diffusion techniques, each of which uses a different combination of thresholding approaches, collection of nearby pixels to which the error is spread, error weightings to each of these nearby pixels, and other factors. The Floyd-Steinberg algorithm, developed in 1975 and known to those skilled in the art, is one of the more well-known implementations of error diffusion. This algorithm generates a series of error values for each image element as an image line is transformed. These error values are calculated by taking a fraction of nearby pixel error values and adding them together to represent a pixel location.

With reference to FIG. 4, in the Floyd-Steinberg algorithm, the error at a transformed pixel 420 is spread to a collection of four specific nearby pixels in the fashion shown in FIG. 4a. The error from a just-transformed pixel 420 is spread to pixels 422, 424, 426 and 428 using error spread weights 7/16, 1/16, 5/16 and 3/16, respectively, with the error spread weights representing the proportion of error at transformed pixel 420 that is spread to each adjacent untransformed, error-receiving pixel. Thus, from the perspective of a just-transformed pixel 420, its total error is spread to "Next Back" pixel 428 (with "send backward coefficient" 3/16), "Next Below" pixel 426 (with "send below coefficient" 5/16), "Next Forward" pixel 424 (with "send forward coefficient" 1/16), and "Current Right" pixel 422 (with "send right coefficient" 7/16). In the foregoing nomenclature, the prefix "Next" refers to the next line to which the corresponding errors are spread.

FIG. 4b shows receipt of partial errors from the perspective of a pixel 450 that is about to be transformed using Floyd-Steinberg error diffusion. Soon-to-be transformed pixel 450 receives a portion of the error from each of four nearby, previously transformed pixels 452, 454, 456 and 458, using error spread weights of 7/16, 1/16, 5/16 and 3/16, respectively. Of these, pixels 454, 456 and 458 are on the previous line ("above"), while recently-transformed pixel 452 is immediately to the left of untransformed pixel 450, on the current line. From the perspective of untransformed pixel 450, error is received from "Previous Back" pixel 454 (with "receive backward coefficient" 1/16), "Previous Above" pixel 456 (with "receive above coefficient" 5/16), "Previous Forward" pixel 458 (with "receive forward coefficient" 3/16), and "Current Left" pixel 452 (with "receive left coefficient" 7/16). In the foregoing nomenclature, the prefix "Previous" refers to the previous line from which the corresponding errors are received.

From the foregoing description, it can be seen that in the Floyd-Steinberg algorithm, the error created from transforming a pixel is spread to four adjacent pixels. Furthermore, prior to transformation, each pixel receives a portion of the error from each of the four adjacent pixels that have previously been transformed. The Floyd-Steinberg algorithm typically operates in row-order (sometimes called "line-order"). That is, an entire row, or line, of an image is transformed before the next row or line is transformed. Transformation of a row results in the storage of a large number of error values. For instance, if an image has a resolution of 600 pixels per inch (PPI), and each row of the image is 9 inches wide, then 5400 pixels worth of error data, each error datum comprising anywhere from 1 color (for a black & white printer) to 3 or more colors (for a color printer), may need to be stored.

Originally, Floyd-Steinberg-type error diffusion was implemented in software with data being read from, and written to a main memory having ample space. More recently, however, high-speed ASIC-based hardware implementations using integer arithmetic have been realized.

FIG. 5 shows a block diagram of a prior art error diffusion system 500 implemented in hardware. The system 500 may belong to a printer that receives an image with multi-bit data pixels and outputs halftone images while using an error diffusion algorithm, not the unlike Floyd-Steinberg algorithm described above.

The system 500 includes a general purpose microprocessor 510 that is connected to a main memory 504. Main memory 504 typically stores the input pixel data 506 of an image whose pixels are to be transformed from a non-binary format to a binary format using error diffusion.

The microprocessor 510 is part of an Application Specific Integrated Circuit (ASIC) 502 (represented by the dashed line) configured to implement error diffusion. The dotted arrows represent connections between the microprocessor 510 and the other components of the ASIC, through data buses, control buses and other structures known to those skilled in the art of integrated circuit design. A second microprocessor off the ASIC (not shown) may be used for overall control by enabling/disabling the ASIC or components thereof, setting various coefficients and parameters such as image dimensions and pixel line addresses, and the like.

In addition to the microprocessor 510, the ASIC 502 includes an error diffusion processor 520, an error spread coefficient subsystem 530, threshold generation logic or circuitry 540, and an error buffer 550.

The error diffusion processor 520 receives pixel data 506 from the main memory 504, error spread coefficients 532 from the error spread coefficient system 530, and threshold information 542 from threshold generation circuitry 540. The error diffusion processor 520 uses this information, along with previous line running error data 524 from an error buffer 550 to transform the pixel data 506 into error diffused pixel data 526 which is stored in the main memory 504. Control signals 521 are sent from the error diffusion processor 520 to the error spread coefficient system 530 for requesting coefficients and performing other functions.

The error spread coefficient system 530 receives input 512 from the microprocessor 510. It may also receive pixel data 506 in the case of data-driven determinations of the error spread coefficients 532. The error spread coefficient system 530 provides the error diffusion processor 520 with the error spread coefficients 532 to be used in allocating the error from a transformed pixel. As discussed further below, the error spread coefficient system 530 may be implemented in a number of different ways.

The threshold generation circuitry 540 creates a threshold 542 that is used to compare with each adjusted non-binary (e.g., 8-bit) gray level pixel datum to determine whether the corresponding pixel is to be set to "0" or "1". The threshold generation circuitry 540 is under the control of the microprocessor 510 and may take on any number of forms. As seen in FIG. 5, the threshold generation circuitry 540 receives the pixel data 506, and so the thresholds are tone-dependent. In such case, threshold generation circuitry 540 may comprise a look up table, with each possible 8-bit input pixel value in the range of 0-255 being mapped onto a single threshold value. Additional circuitry may be provided to manipulate the tone-dependent threshold values using enhanced precision within the ASIC 502.

People skilled in the art are familiar with implementing tone-dependent thresholds. In simple implementations of tone-dependent thresholds, contiguous ranges of input pixels are mapped onto a single threshold value. One way to do this is to ignore the 'k' lowest bits of the input pixel value and use this as the threshold. Thus, if the k=5 last bits are ignored, then input pixel values between, say, 64 (binary '01000000') and 95 ('binary '01011111') use a threshold of 64. An offset may be added to this to help ensure that the threshold is set to a value between these extremes. For instance, the threshold 'algorithm' may be given as "ignore the last five bits and add 16". In such case, input pixel values 0-31 are mapped onto a threshold value of 16; input pixel values 32-63 are be mapped onto a threshold value of 48, etc. Other paradigms are also possible.

As is known to those skilled in the art, the error diffusion processor 520 typically processes image pixel data in line-order—each pixel belonging to one line of an image is error diffused before pixels of the next line are processed. The error buffer 550 receives partial errors 522 from the error diffusion processor 520 for use in distributing the error from an immediately preceding row of image data and provides these partial errors 524 back to the error diffusion processor 520 for use in adjusting a current pixel value of a pixel in a current row of image data. It is understood that in some prior art embodiments, the error buffer 550 may be instantiated in main memory 504 when memory bandwidth suffices to support the pixel rate. In other prior art embodiments, circuitry for implementing the error buffer 550 may simply be integral to the error diffusion processor 520.

While in the prior art embodiment of FIG. 5 error diffusion is performed using dedicated hardware in the ASIC, it may instead be performed entirely in software by the microprocessor 510. In yet other embodiments, error diffusion may be performed by using a combination of hardware, software and/or firmware. Indeed, as is known to those skilled in the art of designing ASICs, it is even possible to do away with the microprocessor 510 entirely and implement all the needed functionality using micro-processor-free circuitry. It is further understood that in some prior art embodiments, the main memory 504 may also be part of the ASIC 502, or the input pixel data 506 may be stored in a local memory on-board the ASIC 502.

Since its initial introduction, error diffusion has attracted considerable attention, and numerous variants of the algorithm exist. The raster lines of the image may be processed in several directions, including ordinary left-to-right, alternating direction (serpentine), pseudo-random alternating, and space-filling paths. The diffusion weights have been extended to a larger area, optimized, randomized, and adjusted to the tone level of the image. Printer models have been incorporated, edges have been enhanced, clustered dots have been formed, and various refinements have been made to improve the quality of certain tone levels.

Threshold modulation is another aspect of error diffusion that offers much flexibility. Thresholds have been adjusted with random noise, "colored" random noise, one-dimensional signals, two-dimensional signals, and halftoning screens, as well as according to the tone level of the image. Much of this effort is directed at reducing artifacts in the output image, such as the artifacts arising from the error diffusion process.

SUMMARY OF THE INVENTION

In one aspect, the present invention is directed to a method of halftoning an original input image having gray-level values to thereby form a reduced-bit value output image. The inventive method comprises adding a first type of passband dither to input pixels of the original input image to form dithered input pixels, and performing error diffusion on the dithered input pixels using threshold values comprising at least one component, where the at least one component is based on a second type of passband dither.

In this inventive method, the first type of passband dither may be tiled across the image, each tile having substantially zero-mean, "substantially" being interpreted in light of the pixel values in the tile. The first type of passband dither may have a dynamic range less than the dynamic range of the input pixel values. The first component of the threshold values may comprise a tone-dependent threshold indexed by the original pixel value or by the dithered pixel value. The second type of passband dither, which may form a second component of the threshold values, may be the same as the first type of passband dither. The second component may be a scaled multiple of the first component, the scaled multiple being less than 1.

The first type of passband dither may have least 99% of its spectral energy confined to spatial frequencies between 0.05 times a maximum possible spatial frequency and 0.90 times said maximum possible spatial frequency, in each of two spectral dimensions. The method may further comprise determining whether at least one edge is present in a region proximate to a pixel of interest and suspending addition of the first type of passband dither to input pixels, if at least one edge is present. The method may further comprise determining an average pixel value in a region proximate to a pixel of interest and adding very low frequency passband dither, if the average pixel value is either less than a first predetermined level or greater than a second predetermined level.

In another aspect, the present invention is directed to a method of halftoning an original input image having gray-level values to thereby form a reduced-bit value output image. The inventive method comprises adding a first type of passband dither to input pixels of the original input image to form dithered input pixels and then performing error diffusion on the dithered input pixels using tone-dependent threshold values without adding further dither to the tone-dependent threshold values.

In this second aspect, the first type of passband dither may be tiled across the image, each tile having zero-mean. It will be appreciated that "zero mean" and "substantially zero mean" dither may also include a non-zero-mean dither where the error diffusion adjusts for this same or substantially the same non-zero-mean value in another part of the algorithm. The first type of passband dither may have a dynamic range less than the dynamic range of the input pixel values. The tone-dependent threshold values may be indexed by the original pixel value or by the dithered pixel value.

The first type of passband dither may have least 99% of its spectral energy confined to spatial frequencies between 0.05 times a maximum possible spatial frequency and 0.90 times said maximum possible spatial frequency, in each of two spectral dimensions. The method may further comprise determining whether at least one edge is present in a region proximate to a pixel of interest and suspending addition of the first type of passband dither to input pixels, if at least one edge is present. The method may further comprise determining an average pixel value in a region proximate to a pixel of interest and adding very low frequency passband dither, if the average pixel value is either less than a first predetermined level or greater than a second predetermined level.

In yet another aspect, the present invention is directed to an application specific integrated circuit (ASIC) for performing error diffusion. The ASIC in accordance with the present invention is configured to add a first type of passband dither to pixels of the original input image to form dithered input pixels, and then perform error diffusion on the dithered input pixels using predetermined tone-dependent threshold values without adding further dither to the tone-dependent threshold values.

In the inventive ASIC, the first type of passband dither may have a dynamic range less than the dynamic range of the input pixel values. The tone-dependent threshold values may be indexed by the original pixel value or by the dithered pixel value.

DETAILED DESCRIPTION

Figure 1:
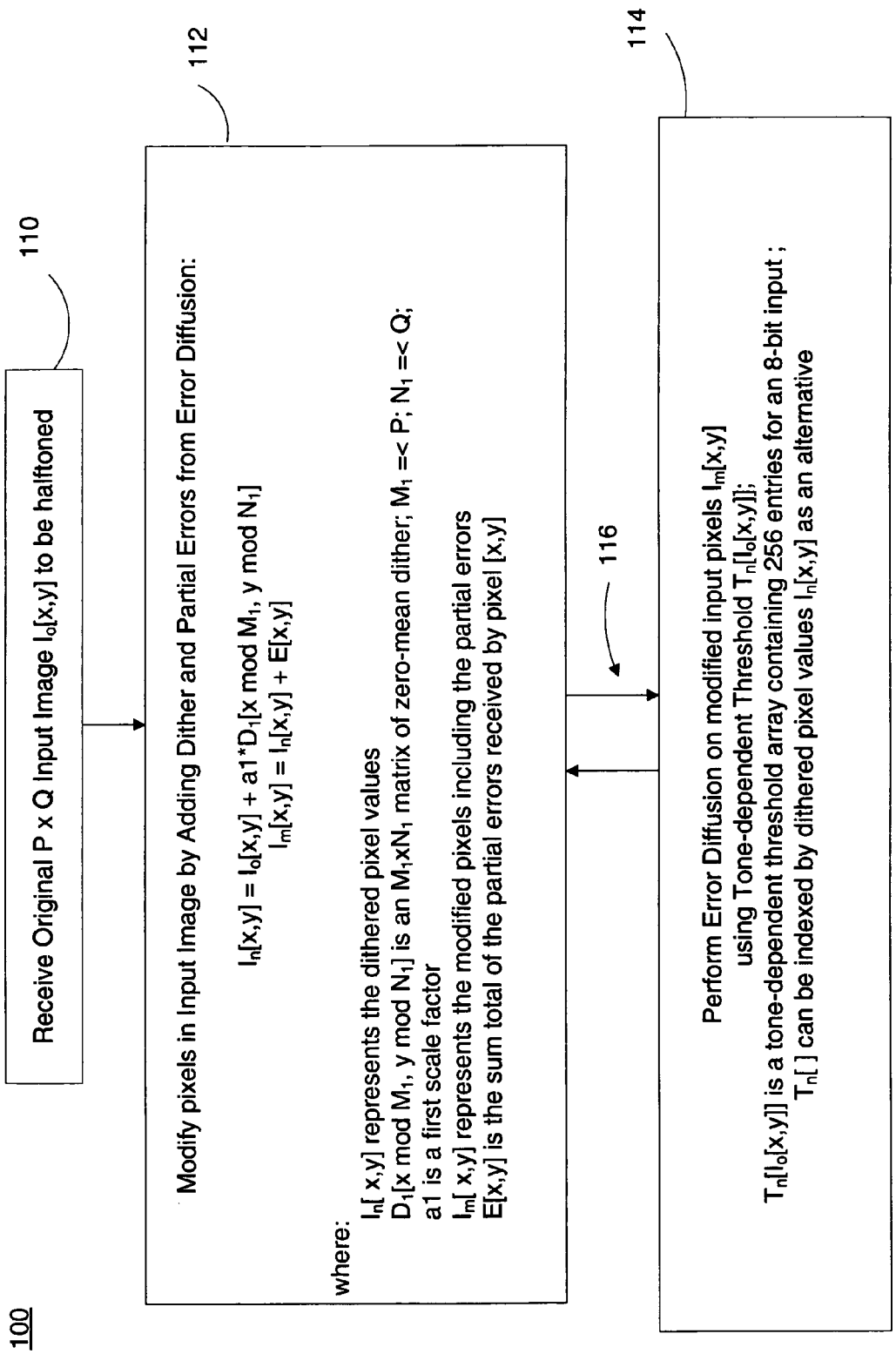
FIG. 1 represents one embodiment of a method in accordance with the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software and/or firmware. As such, it should be noted that a plurality of hardware and software-based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

The term output as used herein encompasses output from any printing device such as a copier, a printer, or a so-called "all-in-one device" which incorporates multiple functions such as scanning, copying, faxing, and printing capabilities in one device. Such printing devices may utilize ink jet, dot matrix, dye sublimation, laser, and any other suitable print formats.

The present invention is directed to halftoning an input image using error diffusion, such as for use in a printer, copier, all-in-one (AIO) or other output device. In a typical scenario, the input image is either 8-bit black and white, or 24-bit color, with three 8-bit RGB color planes, and in the latter case, each 8-bit plane is treated separately. Passband dither is added either to the input image or to both the input image and also to the thresholding matrix used in the error diffusion process.

In all embodiments of the present invention, a first type of passband dither is added to the input pixel values which are to be error diffused.

FIG. 1 shows a flow diagram 100 conceptually depicting a first embodiment of a method in accordance with the present invention.

In step 110, an original input image having original pixel values $I_o[x,y]$ is received. The original input image is of size P×Q pixels, where P represents the number of rows and Q represents the number of pixels (nominally P=5400 and Q=7200, for 600 dpi resolution and a 9"×12" image).

In step 112, a pixel $I_o[x,y]$ of the original input image is modified to form a modified pixel value $I_m[x,y]$. This is done by adding passband dither and the partial errors from the error diffusion process:

$$I_n[x,y] = I_o[x,y] + a1 * D_1[x \bmod M_1, y \bmod N_1] \quad \text{(Eq. 1)}$$

$$I_m[x,y] = I_n[x,y] + E[x,y] \quad \text{(Eq. 2)}$$

where:

$I_n[x,y]$ represents the dithered pixel values;

$D_1[x \bmod M_1, y \bmod N_1]$ is an $M_1 \times N_1$ matrix of zero-mean passband dither of a first type; $M_1 \leq P$; $N_1 \leq Q$;

a1 is a first scale factor;

$I_m[x,y]$ represents the modified pixel values including the partial errors; and $E[x,y]$ is the sum total of the partial errors received by pixel [x,y] from pixels that have been previously diffused.

While $I_m[x,y]$ is shown as being formed using separate equations or steps, it is understood that a modified pixel value may be created in a single sum.

The dither matrix may be of a size as large as the input image (i.e., $M_1$=P; $N_1$=Q). More preferably, however, $M_1$<P, $N_1$<Q, and the dither matrix is tiled across the image, in a known manner. In an exemplary embodiment, $M_1$=$N_1$=128, and so the dither matrix is 128×128.

In step 114, the modified pixel undergoes error diffusion and halftoning using values from a tone dependent threshold array $T_n[I_o[x,y]]$. Thus, if the original input pixels are 8-bit and are in the range [0, 255] the tone-dependent threshold array $T_n[]$ has 256 entries. In one embodiment, the tone-dependent threshold array $T_n[]$ is implemented as a look-up table indexed by the input pixel value $I_o[x,y]$. In another embodiment, the tone-dependent threshold array $T_n[]$ is indexed by information based on the dithered input pixel value $I_n[x,y]$. In such case, those skilled in the art know how to populate such lookup tables, as discussed above in the Background section.

Also with regard to step 114, it is understood that in any practical implementation, error diffusion on an input image with original pixel values $I_o[x,y]$ is typically done one row at a time, and so steps 112 and 114 are repeated, as indicated by the double arrows 116.

In a preferred embodiment in accordance with FIG. 1, in which the input pixel values have a range of [0, 255], $D_1[x, y]$ is a zero-mean passband dither matrix having a range of [−63.5, +191.5], and a scaling factor a1 that is on the order of 0.5 to 0.8. In a particularly preferred embodiment, a1 is $150/256$ or about 0.586. Thus, while the dither matrix $D_1[x,y]$ has a dynamic range of 255 (191.5−−63.5), just like the original input pixels, it has zero mean, and is scaled by a scaling factor a1 that is less than 1.0. This means that the added passband dither has a dynamic range that is narrower (149=0.586×255) than the dynamic range of the original input pixel values (255). This property helps ensure that the passband dither added to the input pixel values, in the aggregate, does not overwhelm the original input image.

Figure 2:
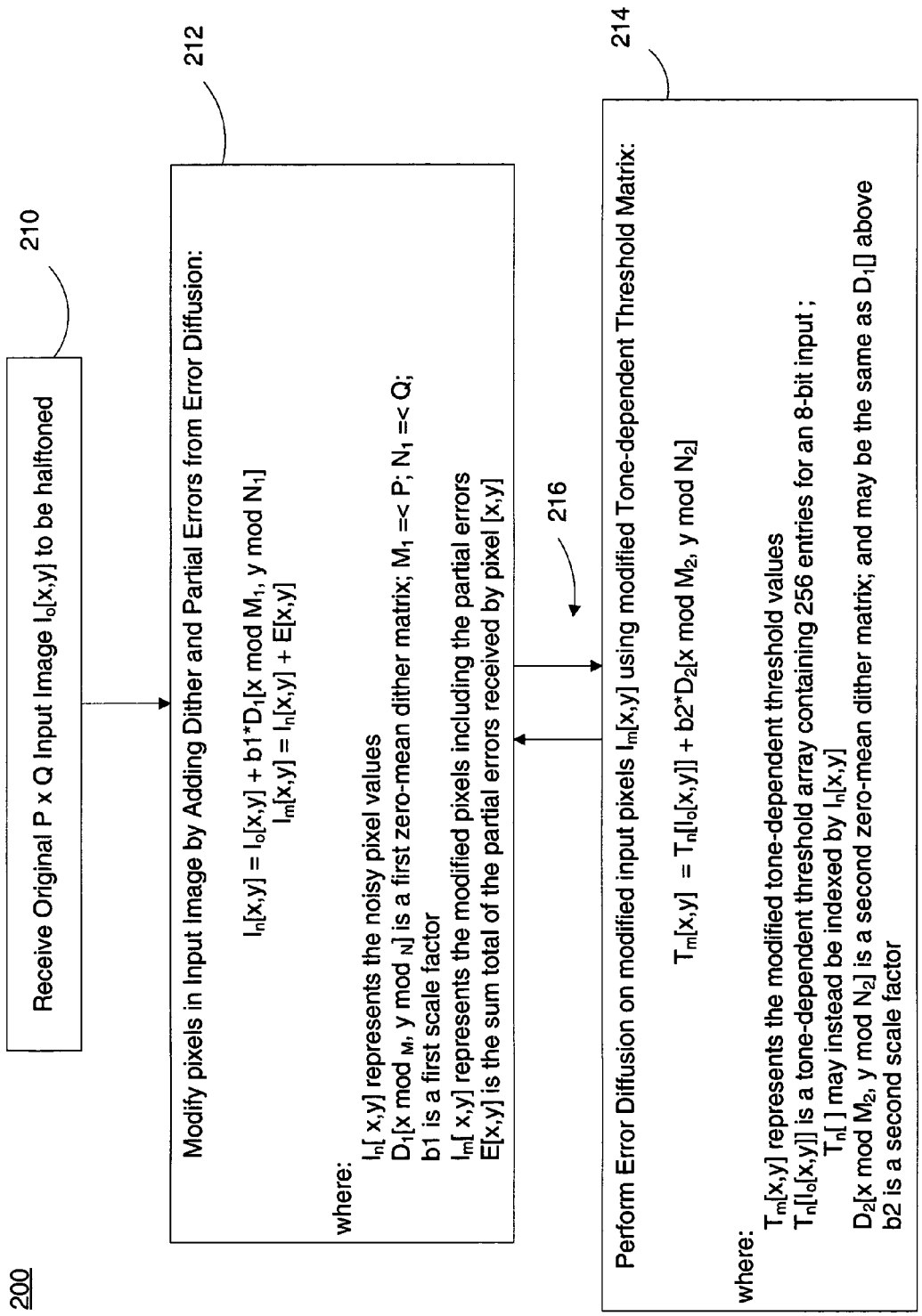
FIG. 2 represents a second embodiment of a method in accordance with the present invention.

FIG. 2 shows a flow diagram 200 conceptually depicting a second embodiment of a method in accordance with the present invention. In this second embodiment, dither is added to pixels of the input image and also to the threshold values. Furthermore, the dither added to the input image pixel values need not be of the same type as that added to the threshold values.

In step 210, an original input image $I_o[x,y]$ is received. Again, the original input image is of size P×Q pixels, where P represents the number of rows and Q represents the number of pixels (nominally P=5400 and Q=7200, for 600 dpi resolution and a 9"×12" image).

In step 212, a pixel of the input image $I_o[x,y]$ is modified to form a modified pixel value $I_m[x,y]$. This is done by adding zero-mean passband dither and the partial errors from the error diffusion process:

$$I_n[x,y] = I_o[x,y] + b1 * D_1[x \bmod M_1, y \bmod N_1] \quad \text{(Eq. 3)}$$

$$I_m[x,y] = I_n[x,y] + E[x,y] \quad \text{(Eq. 4)}$$

where:

$I_n[x,y]$ represents the dithered pixel values;

$D_1[x \bmod M_1, y \bmod N_1]$ is an $M_1 \times N_1$ matrix of zero-mean passband dither of a first type; $M_1 \leq P$; $N_1 \leq Q$;

b1 is a first scale factor;

$I_m[x,y]$ represents the modified pixels including the partial errors; and $E[x,y]$ is the sum total of the partial errors received by pixel $[x,y]$ from pixels that have been previously diffused.

In step 214, the modified pixel undergoes error diffusion and halftoning using values from a modified tone dependent threshold matrix $T_m[x,y]$.

$$T_m[x,y]=T_n[I_o[x,y]]+b2*D_2[x \bmod N_2, y \bmod M_2] \quad \text{(Eq. 5)}$$

where:

$T_m[x,y]$ represents the modified tone-dependent threshold values;

$T_n[I_o[x,y]]$ is a tone-dependent threshold array having as many entries as unique input pixel values (256 for 8-bit input pixels);

$D_2[x \bmod M_2, y \bmod N_2]$ is an $M_2 \times N_2$ matrix of zero-mean passband dither of a second type; $M_2 \leq P$; $N_2 \leq Q$; though $D_2$ may have the same spectral characteristics as $D_1$; and b2 is a second scale factor.

It can be seen from equations (4) and (5) that when $D_1=D_2$, the passband dither added to a particular input pixel is correlated with the dither added to the corresponding tone-dependent threshold value used in the error diffusion step for that pixel. Moreover, the dither added to the tone-dependent threshold value is a scaled multiple f=b2/b1 times that added to the corresponding input values.

Again, it is understood that the tone-dependent threshold array $T_n[]$ is typically implemented as a look-up table of 256 values, for 8-bit input pixels. Again, in one embodiment, the tone-dependent threshold array $T_n[]$ is indexed by the original input pixel value $I_o[x,y]$ while in another embodiment, the tone-dependent threshold array $T_n[]$ is indexed by the dithered input pixel value $I_n[x,y]$.

The modified threshold values $T_m[]$ thus comprise two components. A first component is a tone-dependent threshold (indexed by either the input pixel value or the dithered input pixel value, as discussed above) while a second component comprises the zero-mean passband dither.

Again, since error diffusion is typically performed in row order, steps 212 and 214 are repeated, as indicated by the double arrows 216.

A wide range of periodic signals may be used in accordance with the present invention to serve as the passband dither. These include simple two-dimensional sinusoidal waveforms, with or without certain types of noise added, among others. An exemplary embodiment of the zero-mean passband dither that is added to the input pixel values in the present invention is now described.

Figure 6:
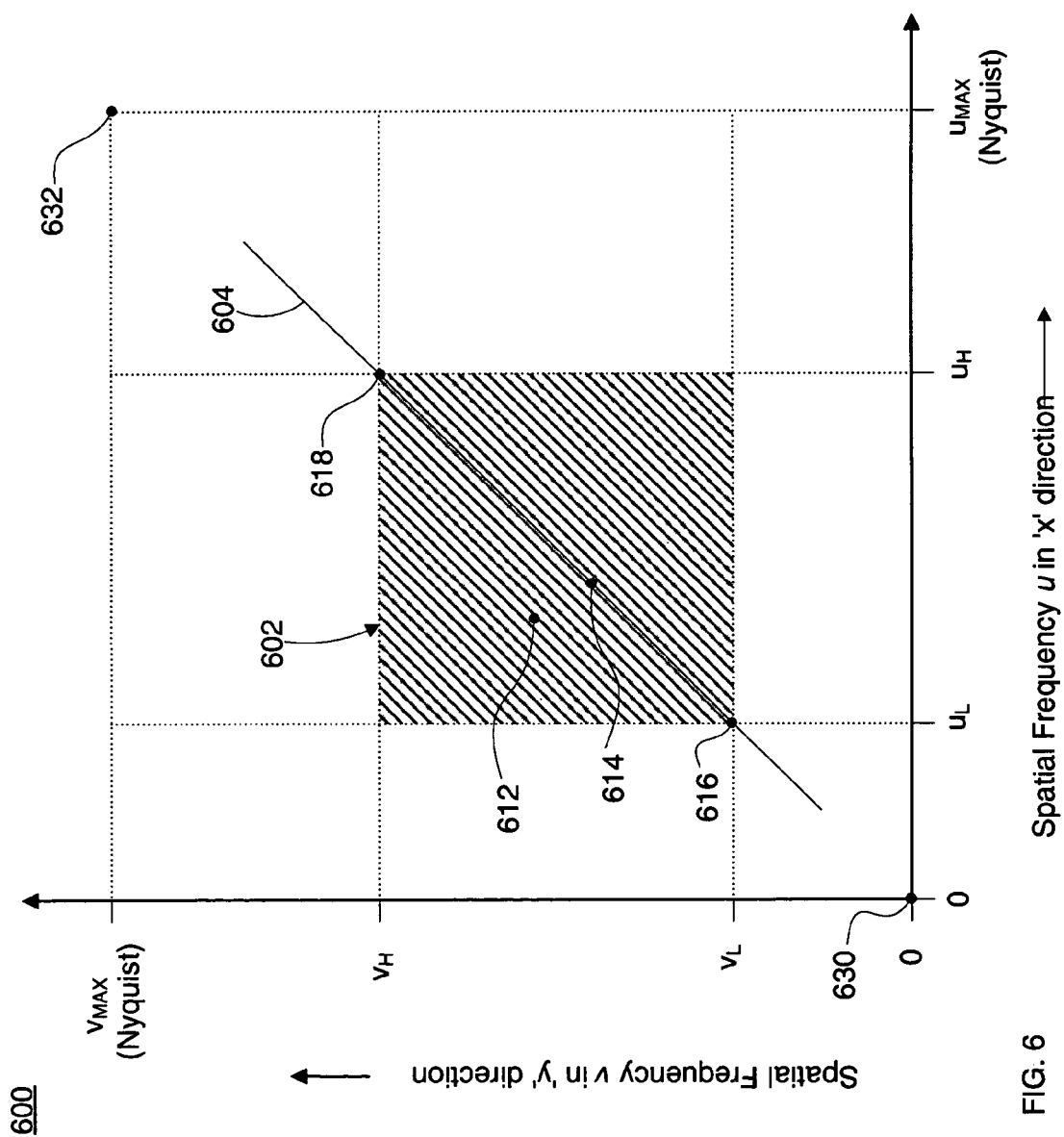
FIG. 6 shows certain spectral characteristics about the passband dither used in accordance with the present invention.

FIG. 6 shows a two-dimensional spectral plot 600 of the characteristics of the two-dimensional passband dither used in the present invention. The plot 600 shows only the 'positive-positive' spatial frequency quadrant, all negative spatial frequencies being omitted for clarity. The x-axis of the plot shows the normalized spatial frequency in the x-direction, designated u. As seen in FIG. 6, u runs from a DC value of u=0 to some normalized maximum value $u=u_{max}$. It is understood that $u_{max}$ corresponds to the maximum possible spatial frequency (Nyquist). The y-axis of the plot shows the normalized spatial frequency in the y-direction, designated v. As seen in FIG. 6, v runs from a DC value of v=0 to some normalized maximum value $v=v_{max}$. It is understood that $v_{max}$ corresponds to the maximum possible spatial frequency (Nyquist).

The shaded area 602 in the plot 600 delimits the spatial frequency of the passband dither. The point at spatial frequency (u,v)=(0,0) designated by reference numeral 630 does not fall in the shaded area 600, since this is a DC component of the dither. Similarly, the point at spatial frequency (u,v)=$u_{max}$, $v_{max}$, designated by reference numeral 632 also does not fall in the shaded area 602, since this the highest possible two-dimensional frequency. Accordingly, the passband dither contemplated in the present invention has the vast majority of its power falling somewhere between these two extremes.

As seen in FIG. 6, the spatial frequencies in the "x"-direction are bounded on the lower side by $u_L$ and on the upper side by $u_H$. Similarly, the spatial frequencies in the "y"-direction are bounded on the lower side by $v_L$ and on the upper side by $v_H$. In a non-limiting embodiment, $u_L$ is about 0.05 $u_{max}$ while $u_H$ is about 0.9 $u_{max}$. Similarly, in this same embodiment, $v_L$ is about 0.05 $v_{max}$ while $v_H$ is about 0.9 $v_{max}$. Preferably, at least 99% of the power of the passband dither falls within these relative values. Thus, the passband dither has at least 99% of its spectral energy confined to spatial frequencies between 0.05 times a maximum possible spatial frequency and 0.90 times said maximum possible spatial frequency, in each of two spectral dimensions.

In one embodiment, the passband dither may take the form of a two-dimensional sinusoid, which may be represented as:

$$D'[x,y]=\sin([2\pi/C_1]x+[2\pi/C_2]y+\theta) \quad \text{(Eq. 6)}$$

where:

$D'[x,y]$ represent the dither values prior to de-meaning;

C1 & C2 are the number of pixels before the sinusoidal pattern repeats in the corresponding direction; and $\theta$ is an angular offset, which may be zero.

In the spectral plot of FIG. 6, a two-dimensional sinusoid with arbitrary values C1 and C2 appears as a single point, such as point 612. In the special case where C1=C2 ("symmetric sinusoid"), the two-dimensional sinusoidal peaks and valleys are evenly spaced in both the x- and y-direction and are represented in the spectral plot 600 as a single point, such as point 614, appearing on the diagonal line 604. It is understood that periodic passband dithers comprising such symmetric sinusoids can be represented by a point anywhere along diagonal line 604 between point 616 ($u_L$,$v_L$) and point 618 ($u_H$,$v_H$) (i.e., within area 602).

In one embodiment for a particular 600 dpi laser printer, C1=C2=7 pixels. In other words, the dither matrix principally comprises a two-dimensional symmetric sinusoid where the peaks and valleys are repeated at roughly every 7 pixels. Generally speaking, it is believed that values of C1 and C2 in the range of 5-9 pixels gives agreeable results for that particular 600 dpi laser printer. For a 1200 dpi laser printer, acceptable values for C1 and C2 may range from a cycle of 10 pixels to a cycle of 20 pixels although other values may be used as well.

In the case of tiling, a small dither matrix $D'[x,y]$ of size $M \times N$ (nominally M=128, N=128) may be created with an original dynamic range of [0,255]. If the matrix, when created, has a mean of $\mu$, then $\mu$ can be subtracted from each value in the matrix to force the mean to zero. This de-meaned small matrix may then be tiled across the image after being adjusted by the scale factor b1, which preferably is less than 1.0.

The dither matrix need not be limited to a single two-dimensional sinusoid, represented by a single point within the area 602. It may, for example, constitute a sum of a plurality of such two-dimensional sinusoids, in which case the dither matrix is manifested in the spatial frequency domain as a corresponding plurality of dots. In other embodiments, band limited noise, whose spatial frequency is limited to the shaded area 602, may be added to such sinusoidal dither, or may be used, by itself, as the dither. An example of such band limited noise may be the "green noise" disclosed in U.S. Pat. No. 6,493,112, whose contents are incorporated by reference.

It can be seen from the foregoing that suitable dithers can be created with a variety of amplitude statistics and spectral characteristics. Thus, at one extreme, the added dither may take the form of a two-dimensional sinusoid and so be periodic in both the x-direction and the y-direction. At another extreme, the dither may be broadband to the extent of the two-dimension shaded passband region 602 in FIG. 6. However, the dither added to the input pixel values should not comprise very low frequencies near DC or frequencies near the maximum spatial frequency. Experimentation has shown that adding very low frequency dither to the input pixel values results in the error diffused, rendered image having a grainy appearance while adding very high frequency dither to the input pixel values runs afoul of the limitations of the printer, thereby also resulting in a grainy appearance. It is further noted that the purpose of adding passband dither to the input pixel values in the present invention is to promote dot clustering in the output image, which contrasts with prior art efforts that added large amounts of noise to tone-dependent thresholds in an effort to break up 'worms' and other artifacts in the output image.

While in one embodiment, the dither may be created and reside in memory, in another embodiment, it may be dynamically generated "on the fly". In the latter case, the microprocessor, or other circuitry, implements the function used to create the dither, in conjunction with information about the x and y indices of the input pixel in question. In this vein, colored noise, perhaps tone-dependent, may be added on the fly to a two-dimensional sinusoidal dither.

Furthermore, the dither that is added may depend on characteristics of the input pixel values. Exemplary characteristics that may be used to determine the nature of the passband dither include the presence of edges and the presence of mean pixel values that are either low or high within a contiguous J×K region of the image. The contiguous J×K region is centered about a particular pixel in question within a row that is being error diffused.

In one particular embodiment using a 5×5 region (J=K=5), the presence of edges is used to determine whether to add dither. As is known to those skilled in the art, edges are detected when there is a transition in the image from light to dark, or vice versa, and established techniques such as using Sobel operators and the like are well-known for edge detection. When edges are detected in a region, it may be desirable to turn off addition of passband dither or, at a minimum, limit the dither to having spectral characteristic at the lower left corner of the shaded area 602 in FIG. 6, i.e., at low frequencies. In such case, one may be considered to selectively add dither to the input pixel values, depending on their content.

In this same embodiment using the 5×5 region, if the mean pixel value m is less than some predetermined reference value $\mu_L$, or greater than some predetermined reference value $\mu_H$, then low frequency dither (still within the passband dither region represented by the shaded region of FIG. 6) is added to the input pixels. For instance, if the mean pixel value is near 255 (i.e., near white) or near 0 (i.e., near black), then very low frequency dither, such as represented by a two-dimensional sinusoid given by point 616 (with frequencies $u_L$, $v_L$) may be used.

In an exemplary embodiment following FIG. 2, in which the input pixels have a range of [0-255], the first and second types of dither are the same ($D_1[]=D_2[]$) and constitute zero-mean dither with a range of [−63.5, +191.5], and the scaling factor b1 is again less than 1.0. In a particularly preferred embodiment, b1 is $^{150}/_{256}$ or about 0.586. This means that the dither added to the input pixel values has a dynamic range that is narrower (149=0.586×255) than the dynamic range of the original input pixel values (255). Again, this property helps ensure that the dither added to the input pixel values, in the aggregate, does not overwhelm the original input image.

Meanwhile, the second scaling factor b2 may be 0.5, and so the dither added to the threshold values is a scaled multiple $f=^{0.5}/_{0.586}$ of the dither added to the input pixel values. As can be seen in this example, the scaled multiple f is less than 1 when the first and second types of dithers are the same. It is understood, however, that these values are exemplary, and that the scaled multiple f is not necessarily limited to values less than 1.0.

Figure 3:
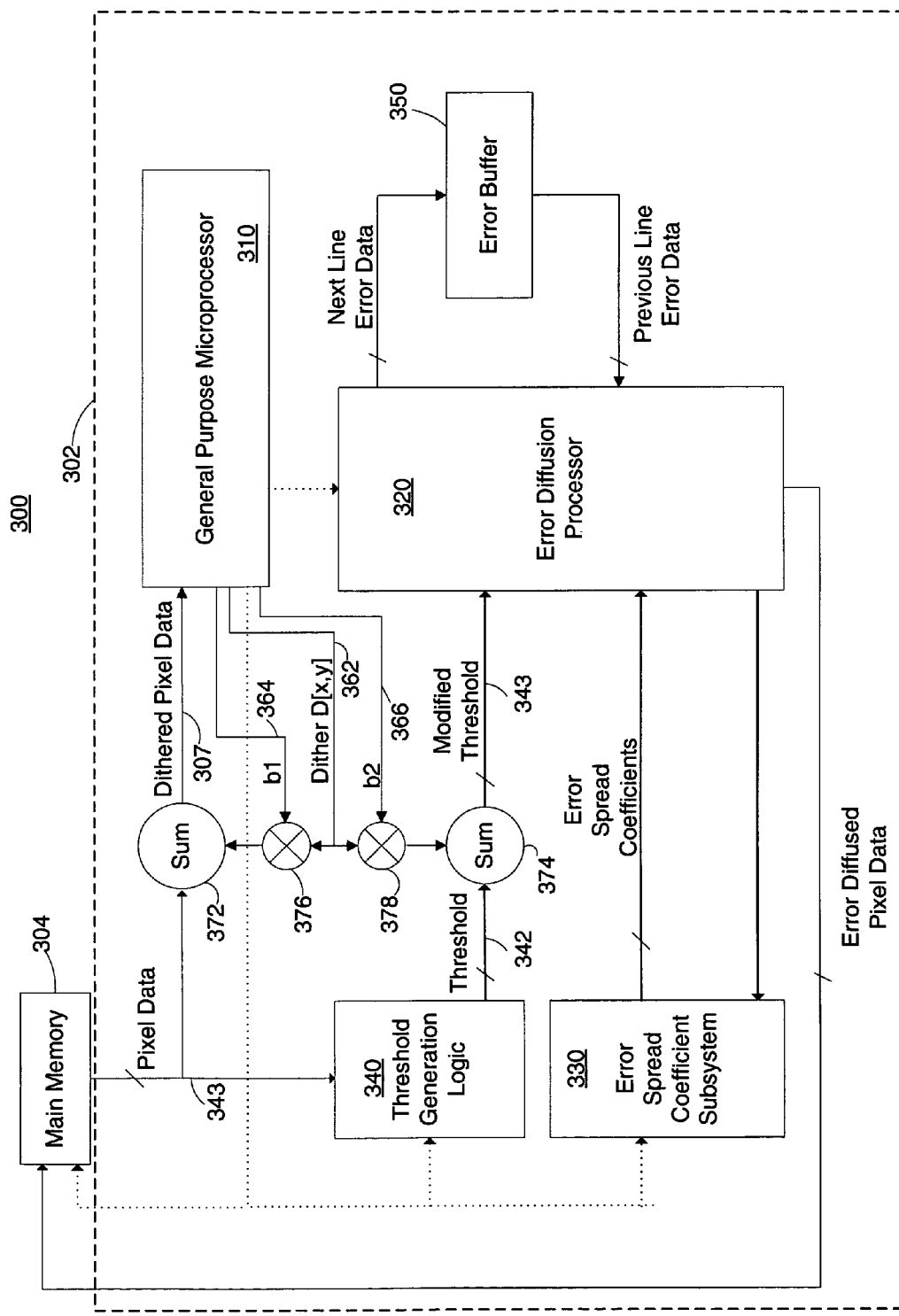
FIG. 3 shows a block diagram of an application specific integrated circuit (ASIC) configured to perform error diffusion in accordance with the present invention
Figure 4A:
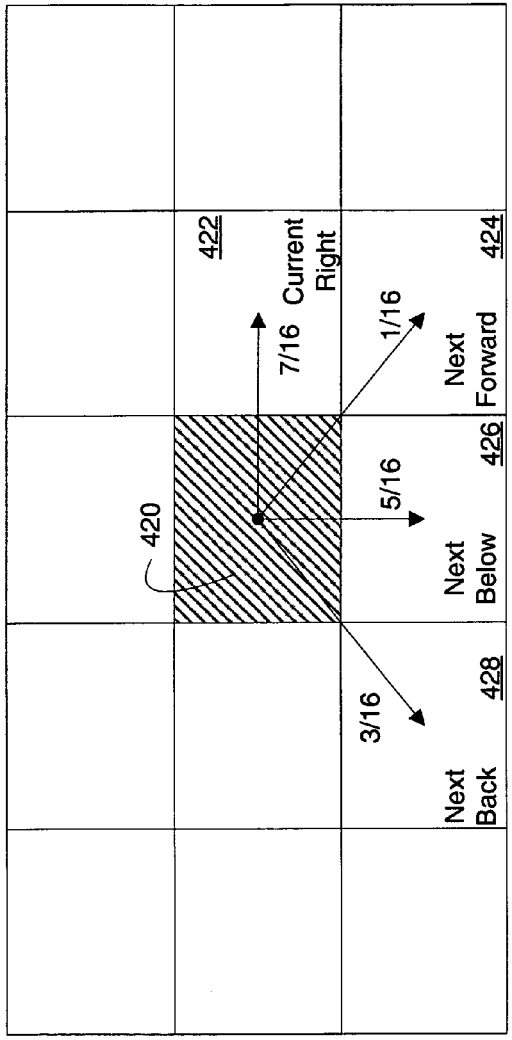
FIGS. 4a and 4b depict conventional error diffusion, showing exemplary error diffusion coefficients.
Figure 4B:
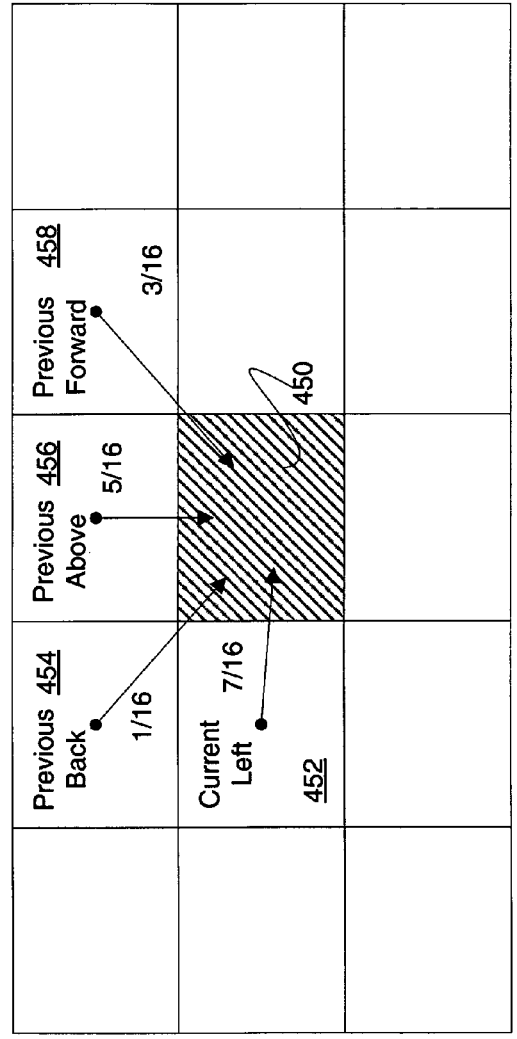
Figure 5:
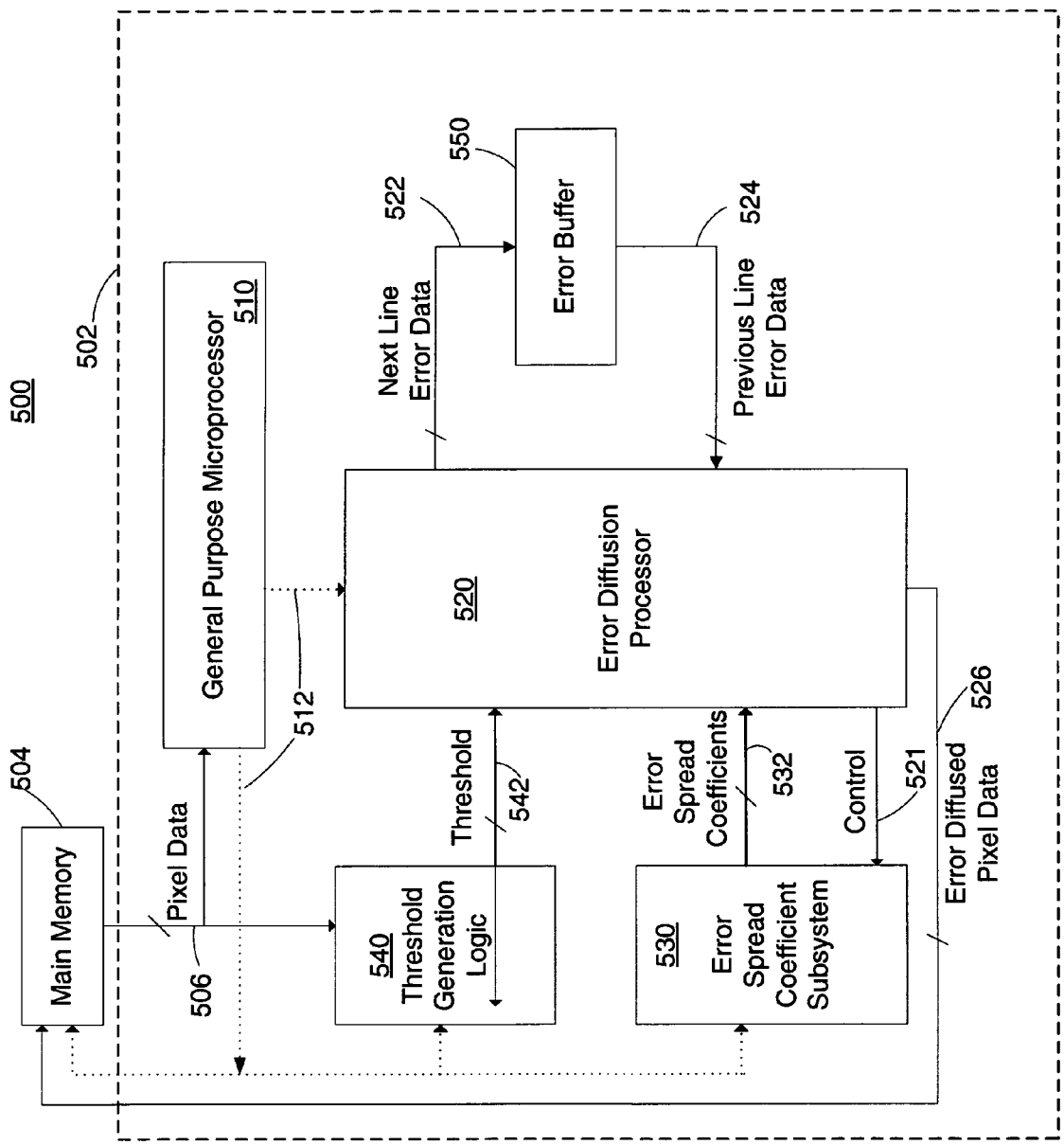
FIG. 5 shows a block diagram of a prior art ASIC configured to perform error diffusion.

While the above described inventive method has been described without reference to the manner of implementation, it is contemplated that the invention can be implemented in an application specific integrated circuit (ASIC). FIG. 3 shows a system 300 including an ASIC 302 and a main memory 304. The system 300, which is an ASIC implementation of the embodiment seen in FIG. 2, may be compared to the prior art ASIC 502 seen in FIG. 5.

Like the ASIC 502 in prior art system 500, the ASIC 302 includes a microprocessor 310, an error diffusion processor 320, an error spread coefficient subsystem 330, threshold generation logic 340, and an error buffer 350. In the embodiment shown, these components are substantially the same as in the prior art ASIC 302 and so are not elaborated upon here.

The principal differences between ASIC 302 and prior art ASIC 502 are the features included to accommodate the addition of passband dither to the input image pixels and to the threshold. However, is to be remembered that in some embodiments of the ASIC 302, much as in the case of the prior art ASIC 302 discussed in the Background section, the microprocessor 310 implements much of the passband dithering of the input pixels in software. Similarly, in other embodiments, no microprocessor is present, and the entire passband dithering and error diffusion processes are implemented in an ASIC devoid of a microprocessor. This can be done with an appropriate combination of dedicated state machines, registers, logic and controls, as is known to those skilled in the art of ASIC design.

As seen FIG. 3, the microprocessor 310 outputs data 362, 364 and 366 which correspond to an appropriate dither value D[x,y], the first coefficient b1 and the second coefficient b2, respectively. While the data lines 362, 364, 366 are seen as discrete lines for illustration purposes, it is understood that the corresponding information may be provided on a data bus with appropriate signaling.

The first coefficient b1 and D[x,y] are input to a first multiplier 376, and this first product is forwarded to first adder 372. At first adder 372, this first product is added to the input pixel value $I_o[x,y]$ 305 to form the dithered pixel data $I_n[x,y]$ 307. Preferably, first coefficient b1 is less than 1.0 so that the output of multiplier 376 (i.e., the passband dither) has a smaller dynamic range than original input pixel values $I_o[x,y]$ 305. The second coefficient b2 and the dither value D[x,y] are input to a second multiplier 378, and this second product is forwarded to second adder 374. At second adder 374, this second product is added to the tone-dependent threshold value $T_n[I_o[x,y]]$ 342 to produce modified threshold value $T_m[x,y]$ 343, which is then input to the error diffusion processor 320.

It is noted that while ASIC 302 shows that the original input pixel data $I_o[x,y]$ 305 is used to index the threshold values in the threshold generation logic 340, one may instead connect the dithered pixel data $I_n[x,y]$ 307 to the threshold generation logic 340 to thereby use information from the dithered input pixel values to index the threshold values.

It is also noted that in the ASIC implementation of FIG. 3, passband dither of the same type (D[x,y]) is added to both the input pixel values and to the thresholds. One skilled in art will readily see, however, that by separately applying a first type of passband dither $D_1[x,y]$ to multiplier 376 and a second type of passband dither $D_2[x,y]$ to multiplier 378, one can realize the implementation discussed with respect to FIG. 1. Furthermore, setting b2=0, allows one to effectively realize the implementation discussed with respect to FIG. 1.

Furthermore, the microprocessor, or other hardware, can be configured to produce or otherwise provide the various passband dither signals discussed above; look for edges in a region proximate to a pixel of interest and, if appropriate, suspend addition of the first type of passband dither; and determine an average pixel value in a region proximate to a pixel of interest and, if appropriate, take any necessary action, all as discussed above.

In the implementation of ASIC 302, the dithered input pixel values $I_n[x,y]$ 307 are computed with hardware adders and multipliers. This requires an ASIC with a circuitry slightly different from the prior art ASIC seen in FIG. 5. As mentioned above, it is possible however, to configure a prior art ASIC to achieve the same effect by appropriate programming of the microprocessor 310. Thus, for example, the microprocessor 310 may perform the entire computation in software and provide dithered input values $I_n[x,y]$ 307 to the error diffusion processor 320. Alternatively, in one embodiment, the dither values D[x,y], already scaled by b1, may be stored in a lookup table, indexed by the pixel [x,y] position, and accessible to the microprocessor 310 which then adds the retrieved information to the input pixel value, and again provides the result to the error diffusion circuitry. Such a lookup table may form a portion of the microprocessor's local memory. The same principles hold for producing the modified threshold values $T_m[x,y]$. What is critical in the embodiment of FIG. 3 is that the ASIC 302 be configured in some manner to add the proper first type of dither to the input pixel values and add the proper second type of dither to the threshold values. In the embodiment shown, the first type of passband dither and the second type of passband dither have the same spectral characteristics and differ by a scalar multiple. However, in other embodiments, as discussed with respect to FIG. 2, the first and second types of passband dither need not have the same spectral characteristics.

The foregoing description of some embodiments of the present invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method of halftoning an original input image having gray-level values to thereby form a reduced-bit output image, comprising:
   adding a first type of passband dither to input pixels of the original input image to form dithered input pixels; and
   performing error diffusion on the dithered input pixels using threshold values comprising at least one component, the at least one component being based at least in part on a second type of dither.

2. The method of claim 1, wherein the second type of dither is the same as the first type of passband dither, the first and second types of passband dither having similar spatial frequency characteristics.

3. The method of claim 1, wherein the second type of dither is a scaled multiple of the first type of passband dither.

4. The method of claim 3, wherein the scaled multiple is less than 1.0.

5. The method of claim 1, wherein the first type of passband dither added to the input pixels has a dynamic range less than that of the input pixels.

6. The method of claim 1, wherein one of the at least one component of the threshold values are tone-dependent thresholds.

7. The method of claim 6, wherein the tone-dependent thresholds are indexed by information based on the dithered input pixels.

8. The method of claim 6, wherein the tone-dependent thresholds are indexed by information based on the original input pixels.

9. The method of claim 1, wherein the first type of passband dither has at least 99% of its spectral energy confined to spatial frequencies between 0.05 times a maximum possible spatial frequency and 0.90 times said maximum possible spatial frequency, in each of two spectral dimensions.

10. The method of claim 1, wherein the first type of passband dither comprises at least one two-dimensional sinusoid.

11. The method of claim 1, wherein the first type of passband dither further comprises band limited noise.

12. The method of claim 1, wherein the first type of passband dither comprises green noise.

13. The method of claim 1, wherein the first type of passband dither is tiled across the image, each tile having substantially zero mean.

14. A method of halftoning an original input image having gray-level values to thereby form a reduced-bit output image, comprising:
   adding a first type of passband dither to input pixels of the original input image to form dithered input pixels; and
   performing error diffusion on the dithered input pixels using tone-dependent thresholds, wherein the tone-dependent thresholds are indexed by information based on the dithered input pixels.

15. An application specific integrated circuit (ASIC) for performing error diffusion and configured to:
   add a first type of passband dither to input pixels of the original input image to form dithered input pixels;
   perform error diffusion on the dithered input pixels using tone-dependent thresholds; and
   add a second type of passband dither to said tone-dependent thresholds.

16. The ASIC of claim 15, wherein the second type of passband dither is the same as the first type of passband dither, the first and second types of passband dither having similar spatial frequency characteristics.

17. An application specific integrated circuit (ASIC) for performing error diffusion and configured to:
   add a first type of passband dither to input pixels of the original input image to form dithered input pixels;
   perform error diffusion on the dithered input pixels using ton-dependent thresholds; and
   index tone-dependent thresholds using information based on the dithered input pixels.

* * * * *